United States Patent Office 3,095,407
Patented June 25, 1963

3,095,407
SUBSTITUTED UREA-ACID COMPLEXES
Harry F. Brust, Midland, Mich., assignor to The Dow Chemical Company, Midland, Mich., a corporation of Delaware
No Drawing. Filed Oct. 6, 1960, Ser. No. 60,810
6 Claims. (Cl. 260—96.5)

The present invention relates to complexes of halogenated saturated fatty acids containing from 3 to 18, inclusive, carbon atoms with substituted urea, the complexes corresponding to the formula

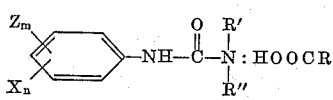

In this and succeeding formulas in the present specification and claims,

HOOCR represents a saturated polyhaloaliphatic monocarboxylic acid containing from 3 to 18, inclusive, carbon atoms and from 2 to 5 inclusive, atoms of halogen selected from chlorine and bromine, two of them being substituents upon the $\alpha$ carbon atom, any others being substituents upon the $\beta$ and $\gamma$ carbon atoms of said acid; R' is an alkyl radical containing up to 2 carbon atoms; R" is hydrogen or an alkyl radical containing up to 2 carbon atoms; X is a halogen, Z is a member of the group consisting of lower alkyl and oxylower alkyl; subscript $n$ is a positive integer up to 2; subscript $m$ is zero or 1; of the benzene ring which is attached to the urea nitrogen atom, at least one unsubstituted carbon atom is adjacent the carbon atom which is attached to said nitrogen atom. An unsubstituted carbon atom is to be understood in its conventional sense as a carbon atom which has only other carbon atoms or hydrogen attached to it. In the present specification and claims, the expression lower alkyl is used to designate an alkyl group containing from 1 to 4, inclusive, carbon atoms.

It is thus apparent that among the haloaliphatic acids to be employed, are $\alpha,\alpha$-dichloropropionic acid, $\alpha,\alpha,\beta$-trichloropropionic acid, $\alpha,\alpha,\beta,\beta$-tetrachloropropionic acid, pentachloropropionic acid and mixtures thereof; and similar halobutyric acids having at least two halogen atoms and those on at least the $\alpha$-carbon atom. Also $\alpha,\alpha$-dibromopropionic acid (melting at 53–54° C.) and $\alpha$-bromo-$\alpha$-chloropropionic acid (melting at 29–30° C.) and other di-$\alpha$-haloaliphatic and polyhaloaliphatic acids as defined are employed.

The novel complexes are crystalline solids soluble in various organic solvents, and practically insoluble in liquid hydrocarbons. They may be dissolved in hot chloroform from which they precipitate upon cooling. They are useful as parasiticides and as herbicides, and are adapted to be employed in the control of fungi.

The new complexes are prepared by causing a reaction between a substituted urea compound corresponding to the formula

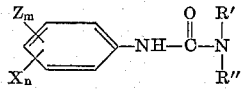

and a halogen substituted fatty acid containing from 3 to 18, inclusive carbon atoms, having from 2 to 5 halogen atoms, two of them as substituents upon the $\alpha$ carbon atom, any others being substituents upon the $\beta$ and $\gamma$ carbon atoms. The reaction may be caused to take place by contacting the said reactants together in the absence of, or preferably in, an inert liquid reaction medium which need not be a solvent and may be a liquid hydrocarbon such as xylene, toluene, petroleum ether or ligroin. The reactants combine in equimolecular quantities to form the said complex. The formation of the complex takes place smoothly at any temperature not much higher than that at which the reaction mixture is liquefied, and this temperature will depend upon whether a solvent is employed and precisely which solvent, and which reactants are employed. Suitable temperatures can easily be ascertained by observing the reaction mixture and noting the temperature at which it first liquefies, and employing such temperature, or a temperature not much higher, to carry the reaction to completion. Typically, a temperature in the range of 30° C. to 100° C. is used. The use of unnecessarily high temperatures is, of course, to be avoided, to avoid thermal damage to reactant or product. When employing temperatures lower than the temperature at which the reaction mixture liquefies, the formation of complex usually takes place, but so slowly as to be inefficient. Under ordinary conditions, the complex forms practically completely and in good yield, and of purity usually determined by the quantitative equivalence and purity of the starting materials, very soon after liquefaction of the reaction mixture.

Good results are obtained when employing the substituted urea reactant and the halo-aliphatic acid in equimolecular proportions; however, when employing certain of the present acid reactants of lower inherent acidity, it may be advantageous to employ one of the two reactants, usually the acid, in 0.01 to 0.2 or more molar excess over the other reactant. The resulting product as thus prepared, contains small to moderate amounts of impurities in the form of uncombined starting material. Such crude products may be employed as prepared, to make use of the advantages and benefits of the present invention. When it is desired to employ the present compositions in pure form, the necessary purification from excess acid is easily carried out. The product and, if any, unreacted acid, are usually liquid at reaction temperatures, whereas unreacted urea compound, if any, is usually solid, and, if desired, may readily be removed by such known procedures as hot filtration. The product, if warm, is thereafter cooled, whereupon the present products become crystalline solids. Further unreacted acid, if any, may then be removed, if desired, by washing the solid product with a liquid hydrocarbon. Such liquid hydrocarbon may, if desired, be included as inert medium in the reaction mixture, wherein it may serve to limit the temperature rise of such mixture at the boiling temperature of such hydrocarbon. Thus the reaction may be carried out under reflux.

When it is desired to disperse the present product, whether crude or purified, on a finely divided solid such as clay or diatomaceous earth to obtain a dust or wettable powder formulation, such solid may simply be added to the reaction mixture with or without prior separation or purification of product. Thereupon, the reaction product which, together with unreacted starting materials, if any, is liquid or largely so, is taken up on the solid as a dispersion which may then be cooled, and if desired, resubdivided as by grinding. Solvent, if any, may be removed by evaporation.

The present complexes are believed to be exclusively stoichiometric in nature; that is to say, the haloaliphatic acid and the substituted urea starting materials are believed to combine at the molecular level, only in a strictly equimolecular ratio. Thus whether an excess of either reactant be employed in the reaction mixture, or both be employed in equimolecular amounts, the resulting complexes, when purified, are found to be composed of equimolecular proportions of each reactant.

While all the complexes of the present invention are, in general, equivalent in the applications and utilities herein set forth, they are subject to some variation in such factors as speed and innate degree of biological activity, efficiency, ease of dispersal in water, cost of raw materials and the like. For these and related reasons, a preferred subgenus within the present invention is a complex of 3-(p-chlorophenyl)-1,1 - dimethylurea combined with a polychloroaliphatic monocarboxylic acid, wherein the acid contains a total of from 3 to 4, inclusive, carbon atoms and from 2 to 3, inclusive, chlorine atoms two of them being substituents upon the α carbon atom of such acid. These preferred complexes of the present invention are prepared from readily available starting materials, have good biological activity, and are easily dispersed in or on adjuvant media wherein they can readily be applied, in employment of their utilities.

The following examples illustrate the invention but are not to be considered as limiting thereof.

*Example 1.—Complex of 2,2-Dichloropropionic Acid With 3-(p-Chlorophenyl)-1,1-Dimethylurea*

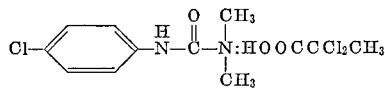

A mixture consisting of 3-(p-chlorophenyl) - 1,1 - dimethylurea (39.8 grams; 0.2 moles) melting at 167–171° C., and 28.6 grams (0.2 mole) 2,2-dichloropropionic acid freezing at 16° C., was heated at 85° C. for 5 minutes to prepare a complex of the urea compound and the acid compound. The resulting product was a crystalline solid melting at 45°–50° C., the structure of which was confirmed by infrared analysis.

In similar procedures, employing 3 - (2,5 - dichlorophenyl)-1,1-dimethylurea and 2,2-dichloropropionic acid there is obtained a crystalline, solid complex of the two said substances.

*Example 2.—Complex of 2,2,3-Trichloropropionic Acid With 3-(p-Chlorophenyl)-1,1-Dimethylurea*

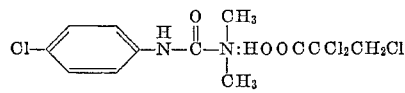

A mixture of 19.9 grams (0.1 mole) of 3-(p-chlorophenyl)-1,1-dimethylurea and 16.8 grams, (0.1 mole) of 2,2,3-trichloropropionic acid was heated on a steam bath at temperatures which ranged from about 20° C. to 85° C. over a period of about 5 minutes, to prepare a complex of the said urea and the said acid. The resulting reaction mixture was then cooled and recrystallized from carbon disulfide to obtain a 2,2,3-trichloropropionic acid complex with 3-(p-chlorophenyl)-1,1-dimethylurea melting at 69–70° C. The structure was confirmed by infrared analysis.

A similar complex is prepared employing 0.1 mole 3-(p-chlorophenyl)-1,1-dimethylurea and 0.175 mole 2,2,3-trichloropropionic acid. The resulting product consists essentially of a mixture of the said previous complex and uncombined 2,2,3-trichloropropionic acid. While the complex in pure form is crystalline, the presence of the excess acid renders the present product liquid at ordinary temperatures. The product is tested, and possesses the useful properties of the purified complex.

In similar manner, other complexes of the present invention were prepared. A 1:1 complex of 2,2-dichlorobutyric acid with 3-(p-chlorophenyl)-1,1-dimethylurea was prepared by heating a mixture of the starting acid and the urea compound for a few minutes at rising temperatures not greater than 90° C.; the identity of the resulting product was confirmed by infrared analysis. A 1:1 complex of 2,2,3-trichlorobutyric acid with 3-(p-chlorophenyl)-1,1-dimethylurea was prepared by heating a mixture of the starting acid and urea compounds for a few minutes at 75° C. The resulting product was purified by recrystallization from carbon disulfide to obtain a crystalline complex melting at 90–91° C. This complex was analyzed and found to have contents of chlorine and nitrogen of 36.25 and 7.1 weight percent as compared with theoretical values of 36.4 and 7.19 percent, respectively.

In procedures similar to the foregoing, employing toluene as liquid reaction medium, there are prepared complexes substantially equivalent with one another and with the foregoing, in the said applications and uses, which result from the reaction together, in approximately equimolecular proportions of:

3-(p-iodophenyl)-1 - methylurea and pentachloropropionic acid (melting at 219°–224° C.)

3-(3-chloro-4-tert.-butylphenyl)-1-methylurea and 2,2-dibromobutyric acid.

3-(2-methyl-4-chlorophenyl)-1,1-dimethylurea and 2-bromo-2-chloropropionic acid (melting at 29.7°–30° C.)

3-(4-isobutoxyphenyl)-1,1-dimethylurea and 2,2 - dichlorohexanoic acid, (boiling at 98°–100° C. under pressure of 2 millimeters of mercury).

3-(3,5-dichloro-4-methylphenyl)-1-methylurea and 2,2-dichlorododecanoic acid, (boiling at 140°–145° C. under pressure of 3 millimeters of mercury).

3-(2-chlorophenyl)-1-methylurea and 2,2-dichlorooctadecanoic acid (melting at 51°–53° C.).

3-(2,5-dichlorophenyl)-1,1-diethylurea and 2,2-dichlorohexadecanoic acid.

3-(3-fluorophenyl)-1,1 - dimethylurea and 2,2,3 - trichlorobutyric acid (melting at 87° C.).

3-(4-iodophenyl)-1,1-dimethylurea and α,α - dichlorovaleric acid which boils at 116°–117° C. under 3 millimeters pressure.

3 - (3 - chloro - 4 - methoxyphenyl)-1-methylurea and α,α,β,β-tetrachloropropionic acid of which the published melting temperature is in the range of 55°–75° C.

The present complexes are useful as herbicides for the control of both broad and narrow leaved non-aquatic plants and are especially adapted to be employed in the control of fungi. For such use, the complexes may be dispersed upon an inert finely divided solid and the resulting preparation employed as a dust, which may be a soil additive. Also, such preparations may be dispersed in water with or without a wetting agent and the resulting aqueous dispersions used as sprays. In other procedures the complexes may be employed in oil or as a constituent of oil-in-water or water-in-oil emulsions or as aqueous dispersions thereof which may be applied as spray, drench, or wash. In a representative operation, the application as a thorough wetting spray to tomato plants of an aqueous dispersion of the complex of 2,2,3-trichloropropionic acid with 3-(p-chlorophenyl)-1,1-dimethylurea at the rate of 0.5 pound per hundred gallons of ultimate composition afforded substantially complete protection against subsequent innoculation with viable spores of

*Alternaria solani* (tomato "early blight") without evident injury to the said plants, whereas plants similarly innoculated with the fungus but without protection from the present complex were uniformly and heavily infested.

The substituted ureas employed as starting materials in the preparation of the present complexes can be prepared by conventional methods, for example, by the methods shown in U.S. Patent 2,655,447, by reaction of a primary or secondary amine with an isocyanate, or carbamyl chloride. The following equations illustrate various methods which can be suitably employed for the preparation of representative ureas.

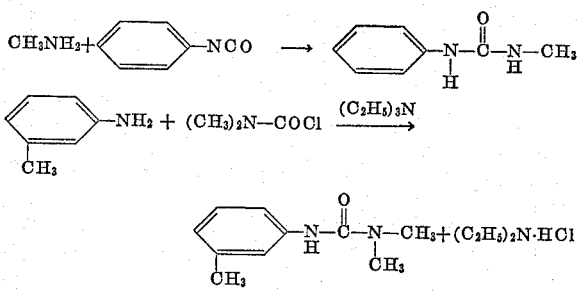

The above reactions are accomplished by bringing the amine in contact with one of the other reactants specified, usually in chemically equivalent amounts, and, if necessary, heating to reaction temperature. It is, in many cases, preferable to use an excess of amine, for example, 10–20 percent molar excess.

Although not, in general, essential, inert liquid media, for example, dry toluene, benzene, chlorobenzene, dioxane, and the like, can, for the most part, be advantageously employed in the methods outlined above. In employing a method wherein acid is evolved, it is advantageous to use an acid acceptor, for example, a tertiary amine such as triethylamine, dimethylaniline, pyridine, and the like. Ordinarily, temperatures in the range of 0 to 100° C., but preferably 15° to 75° C., are satisfactorily employed for the above reactions.

The haloaliphatic acids at least di-$\alpha$-halo-substituted which are used as starting materials in the preparation of the present complexes are all prepared in known methods. They can be prepared by the direct halogenation, with elemental chlorine or bromine, of an unsubstituted aliphatic acid under a halogenation-favoring influence such as iron halide, sunlight, a phosphorus halide, or the like. This is efficient only for the lower aliphatic acids, since in aliphatic acids having larger carbon chains, the position of the entering halogen cannot easily be controlled.

Better results are obtained in preparation of the higher molecular weight acids when directly halogenating an unsaturated acid of which the unsaturation, at a position desired to be halogenated, is destroyed in the halogenation, such halogenation usually favoring the unsaturated sites.

A preferred method for preparing higher haloaliphatic acids involves the well-known free-radical reaction of a lower alkyl ester of a suitable polyhaloloweraliphatic acid with an unsaturated hydrocarbon, under the influence of a catalyst, such as a diacyl peroxide, which readily decomposes when moderately heated, to yield free organic radicals. In such reaction there is formed the ester of the desired higher haloaliphatic acid, usually in excellent yield. The resulting ester is then saponified, as by the action of dilute aqueous alkali, and the resulting product acidified, to obtain the desired acid. Such saponification, while presenting no serious problems, should be carried out moderately to avoid dehalogenating the acid.

The method may be represented as follows:

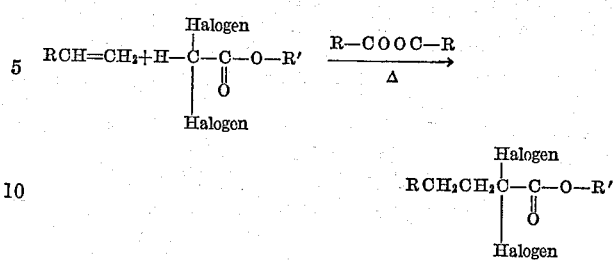

and then

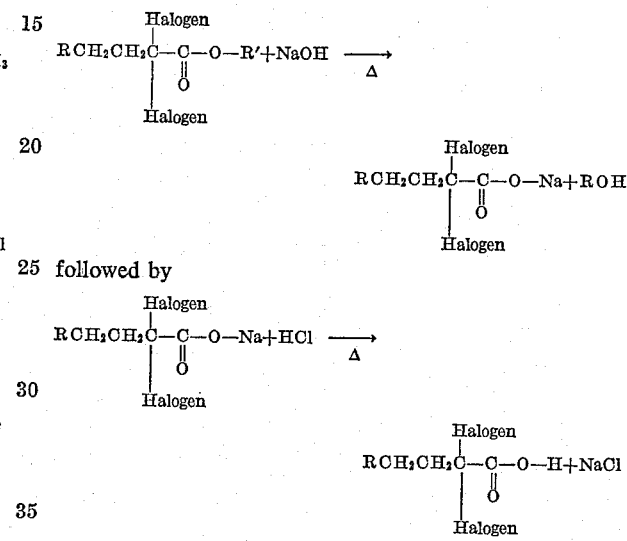

followed by

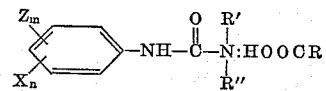

Whereas this reaction shows the use, as starting material, of dichloroacetic acid, any of a large number of loweraliphatic acids, in the present situation polyhaloloweraliphatic acids, may be used with excellent results.

This application is a continuation-in-part of prior application Serial No. 803,823, filed April 3, 1959, and now abandoned.

I claim:

1. Complex of a halogenated saturated fatty acid containing from 3 to 18, inclusive, carbon atoms with substituted urea, the complex corresponding to the formula $$\underset{X_n}{\overset{Z_m}{\diagdown}} \hspace{-2em} \bigcirc \hspace{-1em} -NH-\overset{O}{\overset{\|}{C}}-N\overset{R'}{\underset{R''}{\diagdown}}:HOOCR$$

wherein

HOOCR represent a saturated polyhaloaliphatic monocarboxylic acid containing from 3 to 18, inclusive, carbon atoms and from 2 to 5, inclusive, atoms of halogen selected from the group consisting of chlorine and bromine, two of them being substituents upon the $\alpha$ carbon atom, any others being substituents upon the $\beta$ and $\gamma$ carbon atoms of said acid; R' is an alkyl radical containing up to two carbon atoms, R'' is selected from the group consisting of hydrogen and alkyl containing up to two carbon atoms; X is halogen, Z is a member of the group consisting of lower alkyl and oxylower alkyl; subscript $n$ is a positive integer up to 2; subscript $m$ is an integer in the range of 0 to 1; of the benzene ring which is attached to the urea nitrogen atom, at least one unsubstituted carbon atom is adjacent the carbon atom which is attached to said nitrogen atom; the expression unsubstituted carbon atom defines a carbon atom which is attached only to a member of the group consisting of carbon and hydrogen, and the expression lower alkyl designates alkyl containing from 1 to 4, inclusive carbon atoms.

2. Complex of 3-(p-chlorophenyl)-1-dimethylurea with a polychloroaliphatic monocarboxylic acid, wherein the acid contains a total of from 3 to 4, inclusive, carbon atoms and from 2 to 3, inclusive, chlorine atoms two of them being substituents upon the α carbon atom of said acid.

3. Complex of 3-(p-chlorophenyl)-1,1-dimethylurea with 2,2-dichloropropionic acid.

4. Complex of 3-(p-chlorophenyl)-1,1-dimethylurea with 2,2,3-trichloropropionic acid.

5. Complex of 3-(p-chlorophenyl)-1,1-dimethylurea with 2,2-dichlorobutyric acid.

6. Complex of 3-(p-chlorophenyl)-1,1-dimethylurea with 2,2,3-trichlorobutyric acid.

References Cited in the file of this patent

UNITED STATES PATENTS

| | | |
|---|---|---|
| 2,709,648 | Ryker et al. | May 31, 1955 |
| 2,782,112 | Gilbert et al. | Feb. 19, 1957 |